United States Patent
Cheng et al.

(10) Patent No.: US 12,032,980 B2
(45) Date of Patent: Jul. 9, 2024

(54) DATA PROTECTION WITH DYNAMIC RESOURCE ISOLATION FOR DATA PROCESSING ACCELERATORS

(71) Applicants: Baidu USA LLC, Sunnyvale, CA (US); KUNLUNXIN TECHNOLOGY (BEIJING) COMPANY LIMITED, Beijing (CN)

(72) Inventors: Yueqiang Cheng, Sunnyvale, CA (US); Zhibiao Zhao, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 540 days.

(21) Appl. No.: 16/891,508

(22) Filed: Jun. 3, 2020

(65) Prior Publication Data
US 2021/0382737 A1    Dec. 9, 2021

(51) Int. Cl.
*G06F 9/455*    (2018.01)
*G06F 9/50*    (2006.01)

(52) U.S. Cl.
CPC ........ *G06F 9/45558* (2013.01); *G06F 9/5011* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,634,650 B1 | 12/2009 | Shah et al. | |
| 8,156,253 B2 * | 4/2012 | Watanabe | G06F 9/45558 718/104 |
| 8,761,187 B2 * | 6/2014 | Barde | H04L 49/70 370/386 |
| 9,218,303 B2 * | 12/2015 | Chandrasekhar | H04L 41/145 |
| 9,294,567 B2 * | 3/2016 | Hussain | H04L 41/0866 |

(Continued)

FOREIGN PATENT DOCUMENTS

| | | |
|---|---|---|
| CN | 103049331 A | 4/2013 |
| EP | 3306870 A1 | 4/2018 |

(Continued)

OTHER PUBLICATIONS

Xue et al. "Shaready: a Resource-Isolated Workload Co-location System", 2019 IEEE, pp. 299-304.*

(Continued)

*Primary Examiner* — Van H Nguyen
(74) *Attorney, Agent, or Firm* — WOMBLE BOND DICKINSON (US) LLP

(57) ABSTRACT

Embodiments of the disclosure discloses a method and system of a virtualization environment for a data processing (DP) accelerator. In one embodiment, a data processing (DP) accelerator includes a resource management unit and one or more dynamically isolated resources managed by the resource management unit. The DP accelerator includes one or more virtual functions (VFs) each associated with one of the one or more dynamically isolated resources, where a virtual machine (VM) of a host is assigned one of the one or more VFs to access the dynamically isolated resources associated with the assigned VF, and where the VM has no access to the rest of the one or more dynamically isolated resources.

17 Claims, 6 Drawing Sheets

(56) References Cited

U.S. PATENT DOCUMENTS

| | | | |
|---|---|---|---|
| 9,298,484 B2 * | 3/2016 | Cadigan, Jr. | G06F 9/455 |
| 9,501,245 B2 * | 11/2016 | Hussain | G06F 3/0643 |
| 9,813,283 B2 | 11/2017 | Cohen et al. | |
| 10,223,159 B2 | 3/2019 | Kaplan et al. | |
| 10,353,727 B2 * | 7/2019 | Alvarez | G06F 9/5077 |
| 10,423,437 B2 * | 9/2019 | Kaplan | G06F 9/45558 |
| 10,740,456 B1 | 8/2020 | Ismael et al. | |
| 10,853,129 B1 * | 12/2020 | Sengupta | G06N 3/105 |
| 10,972,449 B1 * | 4/2021 | Levin | G06F 21/606 |
| 2009/0133016 A1 | 5/2009 | Brown et al. | |
| 2009/0144731 A1 | 6/2009 | Brown et al. | |
| 2011/0239039 A1 * | 9/2011 | Dieffenbach | H04L 41/0889 709/224 |
| 2011/0321042 A1 | 12/2011 | Yang et al. | |
| 2013/0042086 A1 | 2/2013 | Cardona et al. | |
| 2013/0042240 A1 | 2/2013 | Cardona et al. | |
| 2013/0055254 A1 | 2/2013 | Avasthi et al. | |
| 2014/0372739 A1 | 12/2014 | Arroyo et al. | |
| 2015/0370595 A1 | 12/2015 | Arroyo et al. | |
| 2016/0103698 A1 | 4/2016 | Yang et al. | |
| 2016/0127495 A1 | 5/2016 | Tasoulas et al. | |
| 2016/0149877 A1 * | 5/2016 | Kancharla | G06F 9/45558 713/171 |
| 2016/0239326 A1 | 8/2016 | Kaplan et al. | |
| 2017/0228183 A1 | 8/2017 | Hussain et al. | |
| 2017/0344391 A1 * | 11/2017 | Alvarez | G06F 9/45558 |
| 2018/0157521 A1 | 6/2018 | Arikatla et al. | |
| 2018/0225237 A1 | 8/2018 | Edirisooriya et al. | |
| 2018/0321985 A1 | 11/2018 | Kakaiya et al. | |
| 2019/0107965 A1 | 4/2019 | Deval et al. | |
| 2019/0121671 A1 | 4/2019 | Guim Bernat | |
| 2020/0409735 A1 | 12/2020 | Grandhi et al. | |
| 2021/0109792 A1 | 4/2021 | Cheng et al. | |
| 2021/0149733 A1 | 5/2021 | Cheng et al. | |
| 2021/0150002 A1 | 5/2021 | Cheng et al. | |
| 2021/0150406 A1 | 5/2021 | Cheng et al. | |
| 2021/0152600 A1 | 5/2021 | Cheng et al. | |

FOREIGN PATENT DOCUMENTS

| | | |
|---|---|---|
| EP | 3614261 A1 | 2/2020 |
| JP | 2008097173 A | 4/2008 |
| WO | 2015010597 A1 | 1/2015 |
| WO | 2018176393 A1 | 10/2018 |

OTHER PUBLICATIONS

Wang et al. "Improving Utilization through Dynamic VM Resource Allocation in Hybrid Cloud Environment", 2014 IEEE, 8 pages.*

Real et al "Dynamic Spatially Isolated Secure Zones for Noe-based Many-core Accelerators", 2016 IEEE, 6 pages.*

Pohl et al "Resource Management for the Heterogeneous Arrays of Hardware Accelerators", 2011 IEEE, pp. 486-489.*

Configure SR-IOV Network Virtual Functions in Linux KVM' by Clayne B Robison, Jun. 19, 2017. (Year: 2017).

NFV Acceleration (Part 2)' by GalSagie, Jan. 25, 2015. (Year: 2015).

Hardware supported efficient accelerator partitioning for workstation consolidation and virtualization' by Johannes Hiltscher, 2015. (Year: 2015).

Patrick Kutch: "PCI-SIG SR-IOV Primer An Introduction to SR-IOV Technology Intel LAN Access Division", Jan. 1, 2011 (Jan. 1, 2011), pp. 1-28,.

Jianping Zhu et al: "Enabling Privacy-Preserving, Compute- and Data•Intensive Computing using Heterogeneous Trusted Execution Environment", arxiv.org, Cornell University Library, 201 Olin Library Cornell University Ithaca, NY 14853, Apr. 9, 2019 (Apr. 9, 2019), pp. 1-16, XP081167169.

* cited by examiner

DATA PROTECTION WITH DYNAMIC RESOURCE ISOLATION FOR DATA PROCESSING ACCELERATORS

TECHNICAL FIELD

Embodiments of the invention relate generally to data protection. More particularly, embodiments of the invention relate to systems and methods for data protection with dynamic resource isolation for data processing (DP) accelerators.

BACKGROUND

Sensitive transactions are increasingly being performed by data processing (DP) accelerators such as artificial intelligence (AI) accelerators or co-processors. This increases a need for better partition/isolation between DP accelerators.

For example, a malicious DPA installed into an existing cluster can obtain without permission AI models/data from other DPAs when a communication channel between DPAs is possible such that AI models and data processed by the DPAs may not be protected.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
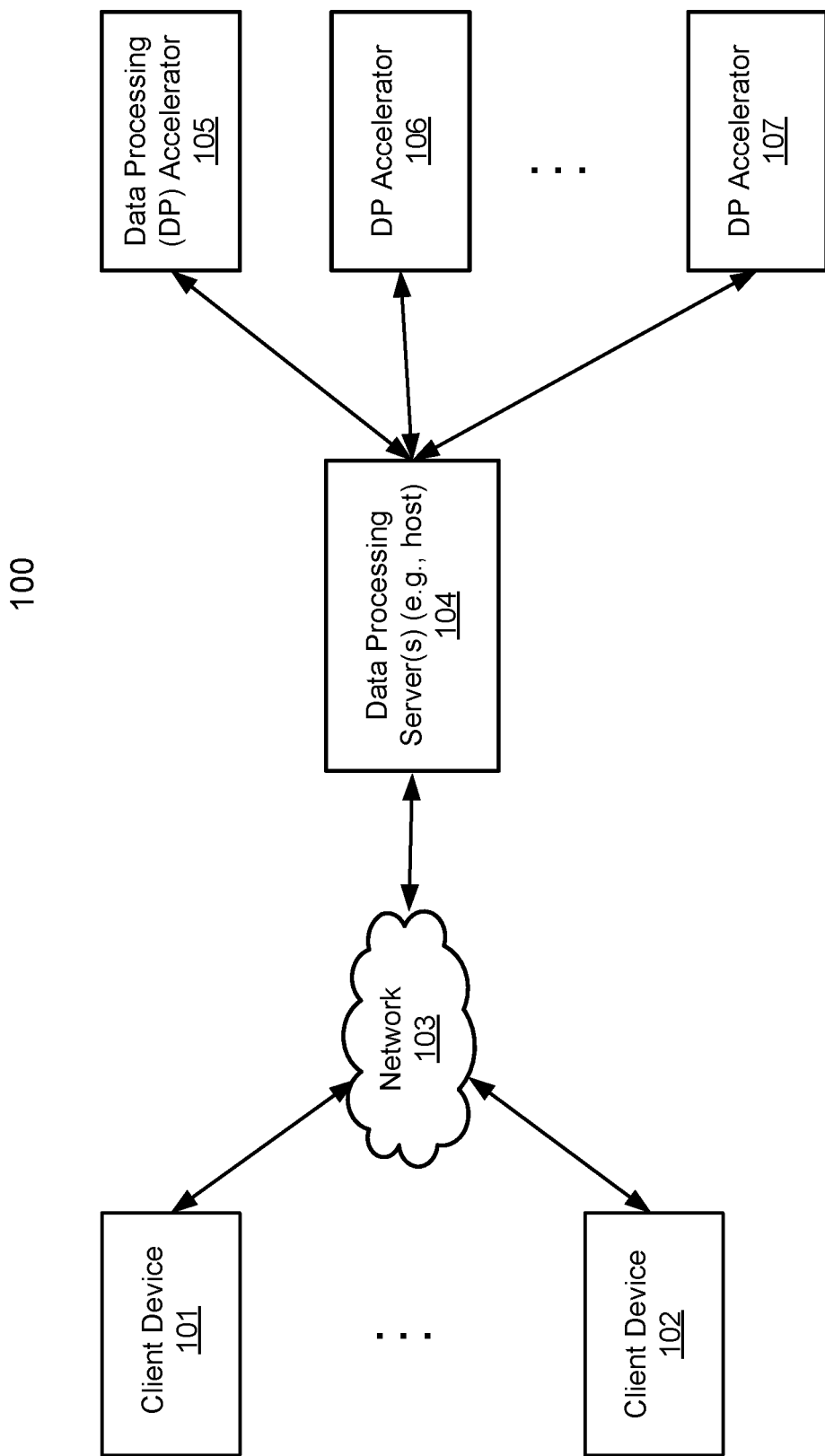
FIG. 1 is a block diagram illustrating an example of system configuration for a host and data process (DP) accelerators according to some embodiments.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to a first aspect of the disclosure, a data processing (DP) accelerator includes one or more statically partitioned resources and one or more virtual functions (VFs), each of the one or more VFs associated with one of the one or more statically partitioned resources. A virtual machine (VM) of a host is assigned one of the one or more VFs to access the statically partitioned resources associated with the assigned VF. The VM has no access to the rest of the one or more statically partitioned resources of the DP accelerator.

According to a second aspect of the disclosure, a virtual function (VF) receives a request from an application to perform an instruction by a data processing (DP) accelerator using resources of the DP accelerator from a virtual machine (VM), where the receiving is a direct pass through communication, where the VF is dedicated to the VM and the VF is one of a number of VFs of the DP accelerator. The DP accelerator performs the instruction using the DP accelerator resources based on the request and generates a result. The DP accelerator determines one or more memory addresses of the VM. The DP accelerator transmits the result to the VM using the VF based on the one or more memory addresses of the VM.

According to a third aspect of the disclosure, a data processing (DP) accelerator includes a resource management unit and one or more resources that can be dynamically configured and managed by the resource management unit. The DP accelerator includes one or more virtual functions (VFs) each associated with one of the one or more resources, where a virtual machine (VM) of a host is assigned one of the one or more VFs to access the resources associated with the assigned VF, and where the VM has no access to the rest of the one or more resources.

According to a fourth aspect of the disclosure, a virtual function (VF) receives a request from an application for data processing (DP) accelerator resources, where the receiving is a direct pass through communication from a virtual machine (VM) and the VF is dedicated to the VM, where the VF is one of a plurality of VFs of the DP accelerator. The DP accelerator determines a first resource isolation of the DP accelerator that is assigned to the VF. The DP accelerator determines the first resource isolation does not meet a size of the request. The DP accelerator dynamically updates, by a resource management unit of the DP accelerator, the first resource isolation to a second resource isolation to meet the request size.

FIG. 1 is a block diagram illustrating an example of system configuration for a host and data process (DP) accelerators according to some embodiments. Referring to FIG. 1, system configuration 100 includes, but is not limited to, one or more client devices 101-102 communicatively coupled to DP server(s) 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, machine-learning training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu artificial intelligence (AI) chipset available from Baidu, Inc. or alternatively, the DP accelerator may be an AI chipset from NVIDIA, an Intel, or some other AI chipset providers.

According to one embodiment, each of the applications accessing any of DP accelerators 105-107 coupled to data processing server 104 (also referred to as a host) may verify that the application is provided by a trusted source or vendor. Each of the applications may be launched and executed within a virtual machine (VM), or an execution environment (EE) or a container, or a VM within a container, specifically configured and executed by a central processing unit (CPU) of host 104. When an application is configured to access any one of the DP accelerators 105-107, a connection can be established between host 104 and the corresponding one of the DP accelerators 105-107.

Figure 2:
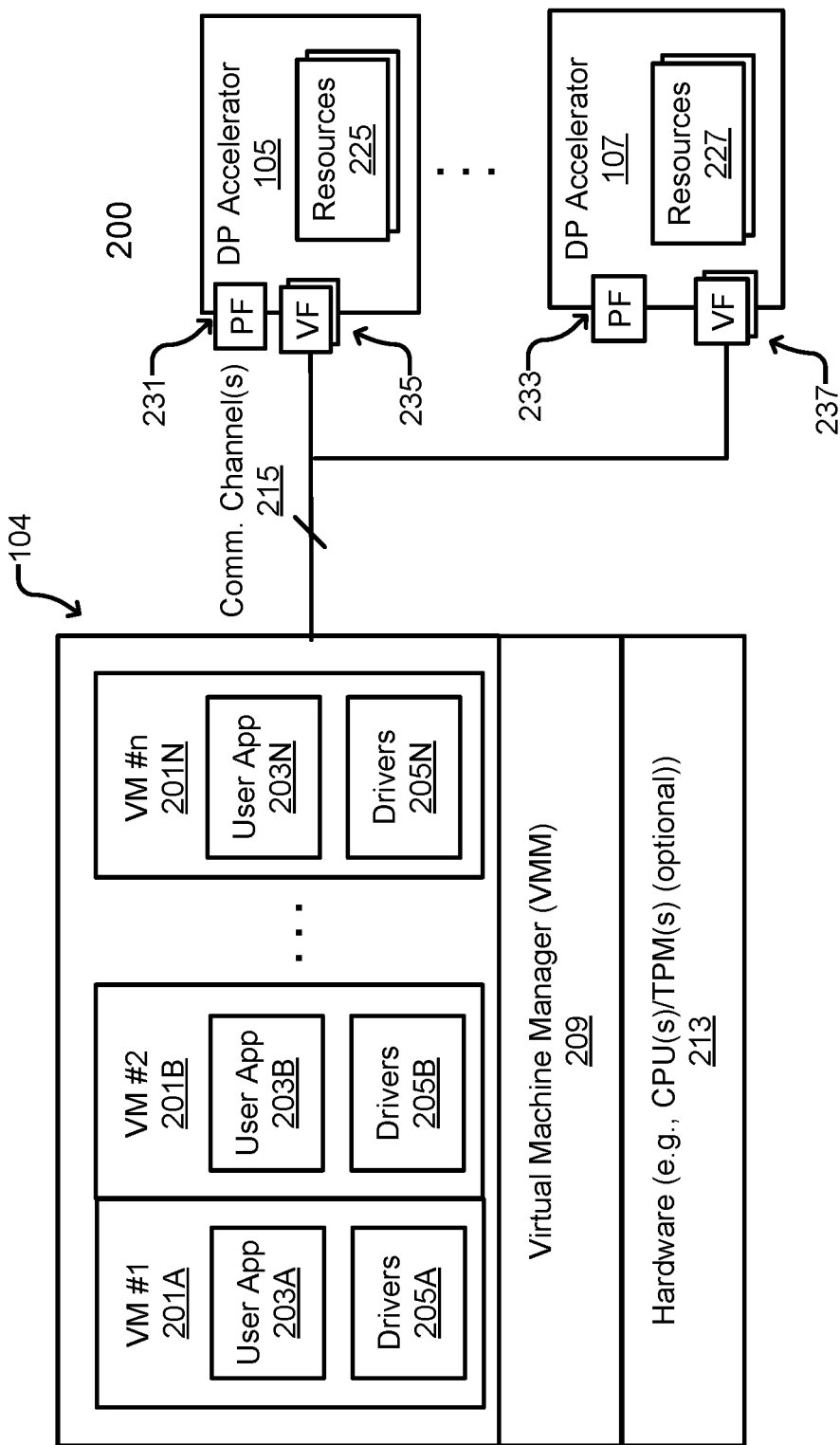
FIG. 2 is a block diagram illustrating an example of a host in communication with data process (DP) accelerators according to one embodiment.

FIG. 2 is a block diagram illustrating an example of a host in communication with data process (DP) accelerators according to one embodiment. Referring to FIG. 2, system 200 provides a virtualized environment for host/server(s) and/or DP accelerators to share common and/or dedicated resources of the DP accelerators. In one embodiment, host machine or server(s) 104 can be a system that host one or more virtual machines (VMs) 201A-201N and each VMs 201A-201N can host an operating system which can run user applications 203A-203N and drivers 205A-205N, respectively. The VMs 201A-201N may be managed by a virtual machine manager (VMM) 209. The VMM 209 (sometimes called a hypervisor) may run on hardware 213 (e.g., central processing unit (CPU), and optionally, security module(s) (e.g., trusted platform modules (TPMs)) of host machine 104. Host machine 104 is typically a CPU system which can control and manage execution jobs of user applications 203 on the host machine 104 and/or DP accelerators 105-107.

In one embodiment, host system 104 includes a hardware that has one or more CPU(s) 213 equipped with security module(s) (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip including a secure boot can secure the VMM 209 from unauthorized accesses. VMM 209 may include drivers provided by a DP accelerator vendor specifying hardware descriptors of the DP accelerators 105-107 for the host 104 to communicate with the DP accelerators 105-107. Since communication channels 215 for DP accelerators 105-107 may be exclusively occupied by VMM 209, thus, communication channels 215 can be secured through the TPM chip.

Referring to FIG. 2, system 200 can include host system 104 and DP accelerators 105-107. DP accelerators 105-107 can include Baidu AI chipsets or any other AI chipsets such as NVIDIA graphical processing units (GPUs) that can perform AI intensive computing tasks. In one embodiment, DP accelerators 105-107 are peripheral component interconnect express (PCIE) components. In one embodiment, communication channels 215 include a PCIE channel.

In one embodiment, each of VMs 201A-201N can represent a secure execution environment or a standalone container, such as a Docker container. Here, host machine 104 can instantiate one or more secure execution environments or standalone containers and each of VMs 201A-201N can be executed within the secure execution environments or standalone containers. The secure execution environments/containers may be enforced to be secure by TPM/CPU 213. Examples of a secure execution environment may be Intel software guard extensions (SGX), or AMD secure encrypted virtualization (SEV), or any non-secured execution environments. Intel SGX and/or AMD SEV can include a set of central processing unit (CPU) instruction codes that allows user-level code to allocate private regions of memory of a CPU that are protected from processes running at higher privilege levels. Here, secure execution environments can protect user applications 203 and drivers 205, where user application 203 and drivers 205 may be provided by end users and DP accelerator vendors, respectively. Here, drivers 205 can convert API calls to commands for execution, configuration, and/or control of the DP accelerators 105-107.

In one embodiment, DP accelerators 105-107 implements the single root I/O virtualization (SR-IOV) implementation standards to allow hardware-based virtualization. The SR-IOV standard enables the efficient sharing of devices among virtual machines and is implemented in the hardware to achieve I/O performance that is comparable to native performance. The SR-IOV specification defines a standard that enables a virtual machine to be directly connected to an I/O device. For example, a DP accelerator device, such as an AI accelerator that is SR-IOV-enabled with appropriate hardware and OS support can appear as multiple, separate physical DP accelerator devices, each with its own PCIE configuration space. In one embodiment, each of DP accelerators 105-107 has at least one physical function (PF) and one or more virtual functions (VFs). SR-IOV can use PF 231-233 to manage the SR-IOV and/or VF functions for the respective DP accelerators 105-107. The VFs/PF of the DP accelerator 105-107 can be mapped to a respective VM. The resource of the DP accelerator can then be accessed directly by the VMs via PF 231-233 and VFs 235-237. In this way, each of the VMs 201 has access to unique and/or shared resources of the DP accelerator 105-107. Note that a VF is a lightweight PCIE function that shares one or more (dedicated or common) resources with a PF and/or other VFs that are associated with that PF. A physical function (PF) is a PCI function that supports the SR-IOV capabilities as defined by the SR-IOV specification. A physical function contains the SR-IOV capability structure and manages the SR-IOV functionality. A PF is a fully featured PCIE function that can be discovered, managed, and manipulated like a PCIE device. A PF can be used to configure and control a PCIE device. The VFs can be created by a PF. After creation, VF can be assigned directly to an I/O domain. This enables the VF to share the physical device and to perform I/O without central processing unit (CPU) and hypervisor overhead.

Referring to FIG. 2, in one embodiment, drivers 205 can provide hardware input/output descriptors (not shown) of the physical functions (PFs) 231-233 and/or virtual functions (VFs) 235-237. VMs 201A-201N of host 104 can access the drivers 205 and communicate with the PFs 231-233 and/or VFs 235-237 via the hardware input/output descriptors within the drivers 205.

The host machine 104 can be set up as follows: A memory-safe Linux distribution is installed onto a system equipped with TPM secure boot. The installation can be performed offline during a manufacturing or preparation stage. The installation can also ensure that user applications 203 are programmed using memory-safe programming languages.

After installation, the system can then boot up through a TPM-based secure boot. The TPM secure boot ensures only signed/certified hardware and VMM are launched in a kernel space that provides the accelerator services. Note, a hypervisor or a virtual machine manager (VMM) is a computer software, firmware, or hardware that creates and runs virtual machines. Note, a kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, VMM 209 may launch instances of VMs 201. Next, user applications 203 and drivers 205 can be launched within an operating system of VMs 201. In one embodiment, user application 203 and drivers 205 are statically linked and launched together. In another embodiment, drivers 205 is launched in VMs 201 first and then user application 203 is dynamically loaded in VMs 201. In another embodiment, user application 203 is launched in VMs 201 first, and then driver 205 is dynamically loaded in VMs 201.

In summary, system 200 provides a hardware-based virtualization environment using one or more VMs situated at the host 104 and SR-IOV enabled DP accelerators having statically partitioned and/or resources. System 200 can include a TPM-based secure boot protection layer and a secure execution environment layer. Furthermore, system 200 can provide a memory safe user space by ensuring other applications on the host machine are implemented with memory-safe programming languages, which can further ensure a security within the applications by eliminating potential memory corruptions/vulnerabilities. In one embodiment, system 200 can include applications that use side-channel free algorithms so to defend against side channel attacks, such as cache based side channel attacks.

Figure 3:
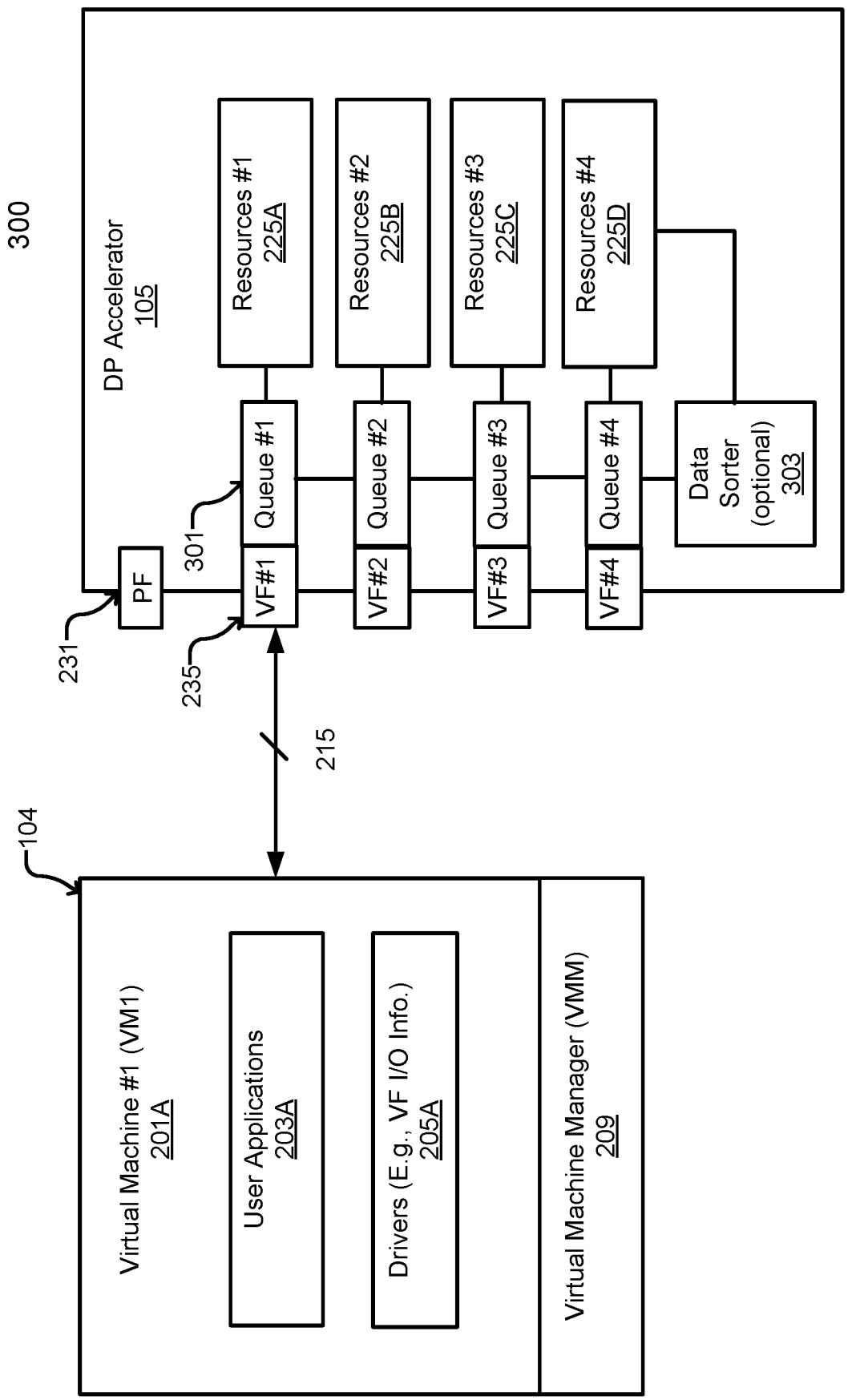
FIG. 3 is a block diagram illustrating an example of static resource partitioning for a DP accelerator according to one embodiment.

FIG. 3 is a block diagram 300 illustrating an example of a host in communication with a DP accelerator according to one embodiment. Referring to FIG. 3, DP accelerator 105 may be statically partitioned into one or more partitions of resources and each of VFs (#1-4) 235 can be associated with a particular static partition of resources. Here, resources 225 of DP accelerator 105 can be statically partitioned into four resource partitions 225A-225D by a manufacturer/vendor of the DP accelerator. Each statistic partition of resources may include a number of I/O resources, data computation processing units, graphics processing units, AI processing units, memory/cache, hard drive space, registers, etc.

In one embodiment, each static partition of resources is unique from other partitions of resources (or dedicated to a particular VF). In one embodiment, one static partition of resources cannot access another static partition of resources and VM assigned to one VF that corresponds to a static partition of resources cannot access another static partition of resources. In one embodiment, the static partitions are not amenable except for deleting and repartitioning of the static partitions.

In one embodiment, drivers 205A-205N provide a hardware input output descriptors for VM 201A-201N respectively to access the VFs 235/PF 231. In one embodiment, each of VFs 235 may or may not share one or more resources of the DP accelerator 105 with the PF 231 and/or other VFs 235. This way, only a VM assigned to a particular VF can access resources associated with the VF. In other words, other VM cannot access the already assigned VF.

In one embodiment, the number of VFs is equal to the number of statically partitioned resources. In one embodiment, when a VM is instantiated, a VMM (or hypervisor) can automatically assign a VF to the VM. In another embodiment, the hypervisor assigns a VF to a container containing the VM. In one embodiment, when the number of VMs connected to the resources is greater than the number of VFs, hypervisor can no longer assign a VF to the VM. In this case, the hypervisor can queue the VM for a next available VF, or drop the assignment, or migrate the VM to another host server system (which may incur additional latency/processing cost for the user application) to use an available VF of the another host server system.

In one embodiment, DP accelerator 105 includes queues 301 and (optionally) data sorter 303. VF 235 (e.g., VF #1) can receive a request from a VM 201A (e.g., VM #1) that is assigned to VF 235 (e.g., VF #1). The request can be an I/O type, machine learning, data processing, AI training, AI inference type of requests, etc. When the DP accelerator 105 completes the request, DP accelerator 105 can determine an identifier, such as a media access control (MAC) address, of the VM 201A based on the request. Data sorter 303 can then sort the result based on the identifier and send the result to a queue 301 (e.g., queue #1) that is associated with the MAC address. Queue 301 then queues the result to be transmitted from VF 235 (e.g., VF #1) to VM 201A (e.g., VM #1) using direct memory access. In another embodiment, when the DP accelerator 105 completes the request, the DP accelerator 105 can determine one or more memory addresses at the VM to store a result of the request. Data sorter 303 can then sort the result based on the memory addresses and send the result to a queue 301 (e.g., queue #1) that is associated with the memory addresses of the VM. Queue 301 then queues the result to be transmitted from VF 235 (e.g., VF #1) to VM 201A (e.g., VM #1) using direct memory access. Here, direct memory access (DMA) is a method that allows an input/output (I/O) device to send or receive data directly to or from a main memory of host 104, bypassing a CPU of host 104.

Figure 4:
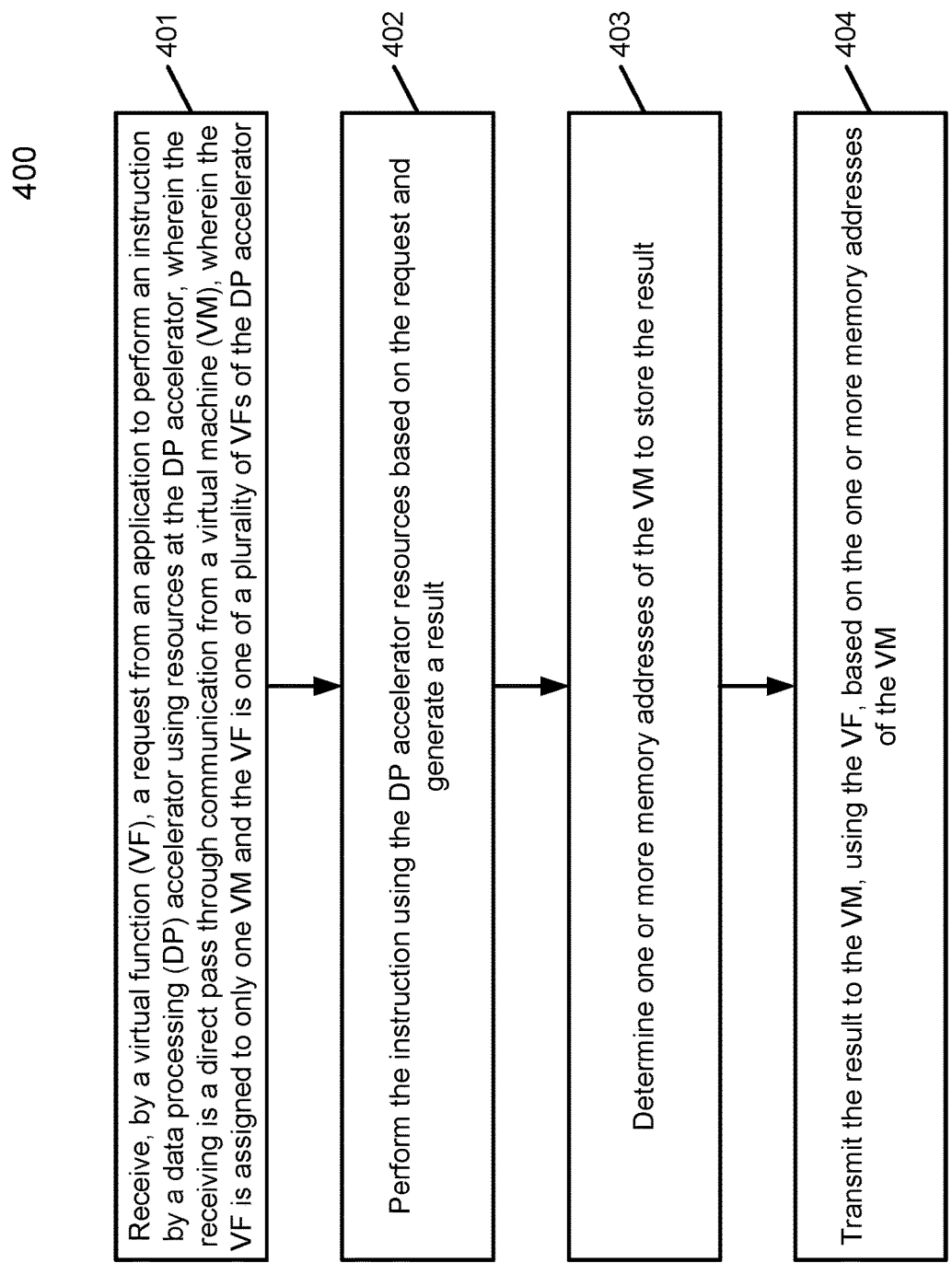
FIG. 4 is a flow chart illustrating an example method for a DP accelerator according to one embodiment.

FIG. 4 is a flow chart illustrating an example method for a DP accelerator according to one embodiment. Process 400 may be performed by processing logic which may include software, hardware, or a combination thereof. For example, process 400 may be performed by host system, such as DP accelerator 105 of FIG. 3. Referring to FIG. 4, at block 401, processing logic (e.g., VF) receives a request from an application to perform an instruction by a data processing (DP) accelerator using resources at the DP accelerator, where the receiving is a direct pass through communication from a virtual machine (VM), where the VF is dedicated to the VM and the VF is one of a number of VFs of the DP accelerator. At block 402, processing logic performs the instruction using the DP accelerator resources based on the request and generates a result. At block 403, processing logic determines one or more memory addresses of the VM to store the result. At block 404, processing logic transmits the result to the VM, using the VF, based on the one or more memory addresses of the VM.

In one embodiment, the instruction is an instruction to train an AI model or to perform an inference based on an AI model. In one embodiment, the hardware I/O information of the VF is located at a driver of the VM at a host hosting the application running on the VM.

In one embodiment, the DP accelerator includes a SR-IOV pass through device. in one embodiment, the VM of the host is initially assigned the VF by a virtual machine manager (VMM) of the host.

In one embodiment, data packets are transmitted between the VM and the VF corresponding to the VM without passing through the VMM. In one embodiment, data packets are transmitted between the VM and the VF corresponding to the VM via direct memory access (DMA) independent of a processing unit of the host.

Figure 5:
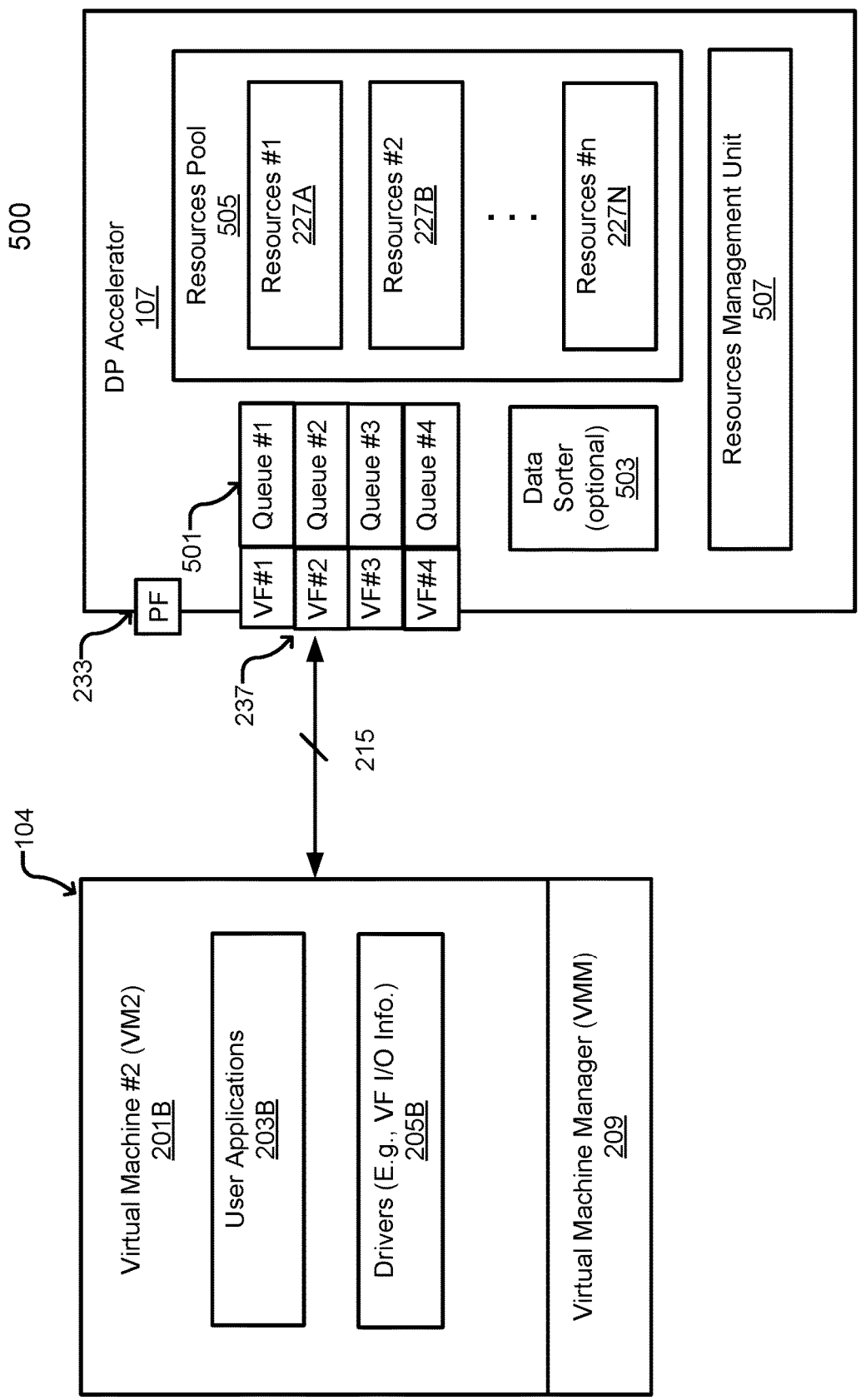
FIG. 5 is a block diagram illustrating an example of dynamically resource isolation for a DP accelerator according to one embodiment.

FIG. 5 is a block diagram 500 illustrating an example of dynamically resource isolation for a DP accelerator according to one embodiment. Referring to FIG. 5, for one example, DP accelerator 107 includes resources pool 505 and resource management unit 507. The resource management unit 507 can manage and enforce resources isolation for resources 227 of resources pool 505. In one embodiment, resources pool 505 can dynamically instantiate a number of resource isolations 227A-227N in real-time. For example, VFs 237 #1-4 may be associated with PF 233. In this case, resources pool 505 can instantiate n resource isolations 227A-227N for the VFs 237 #1-4, respectively. VM 201B can be assigned to any one of the four VFs 237 #1-4 (here, VF #2). VFs #1-4 can access any resource isolations 227A-227N according to a request from a VM at a VF assigned to the VM. Each resource isolation may include a number of I/O resources, data computation processing units, graphics processing units, AI processing units, memory/cache, hard drive space, registers, etc.

In one embodiment, DP accelerator 107 includes queues 501 and (optionally) data sorter 503. VF 237 (e.g., VF #2) can receive a request from a VM 201B (e.g., VM #2) that is assigned to VF 237 (e.g., VF #2) (assigned by VMM 209 of host 104). The request can be an I/O type, machine learning, data processing, AI training, AI inference type of requests, etc. Next, a resource isolation from resource pool 505, such as resource 227B #2 may be dynamically instantiated for the request based on a size of the request.

In one embodiment, in response to determining a larger number of resources is required for the request (or for subsequent requests), VM #2 transmits a control command to resource management unit 507 (via VMM 209 of FIG. 2) to control the resource management unit 507 to dynamically update resource 227B #2. Here, resource 227B #2 may be updated to have a larger number of resources based on the request size. The update may use resources available to or maintained by resource pool 505 (e.g., common resources (not shown) available to resource pool 505).

When the DP accelerator 107 completes the request, DP accelerator 107 can determine an identifier, such as media access control (MAC) address, for the VM #2 based on the request. Data sorter 503 can then sort the result based on the identifier and send the result to a queue 501 (e.g., queue #2) associated with the identifier. Queue 501 then queues the result to be transmitted from VF 237 (e.g., VF #2) to VM 201B (e.g., VM #2) using direct memory access. In another embodiment, when the DP accelerator 107 completes the request, DP accelerator 107 can determine one or more memory addresses at the VM to store a result of the request. Data sorter 503 can then sort the result based on the memory addresses and send the result to a queue 501 (e.g., queue #2) that is associated with the memory addresses of the VM. Queue 501 then queues the result to be transmitted from VF 237 (e.g., VF #2) to VM 201B (e.g., VM #2) using direct memory access.

Figure 6:
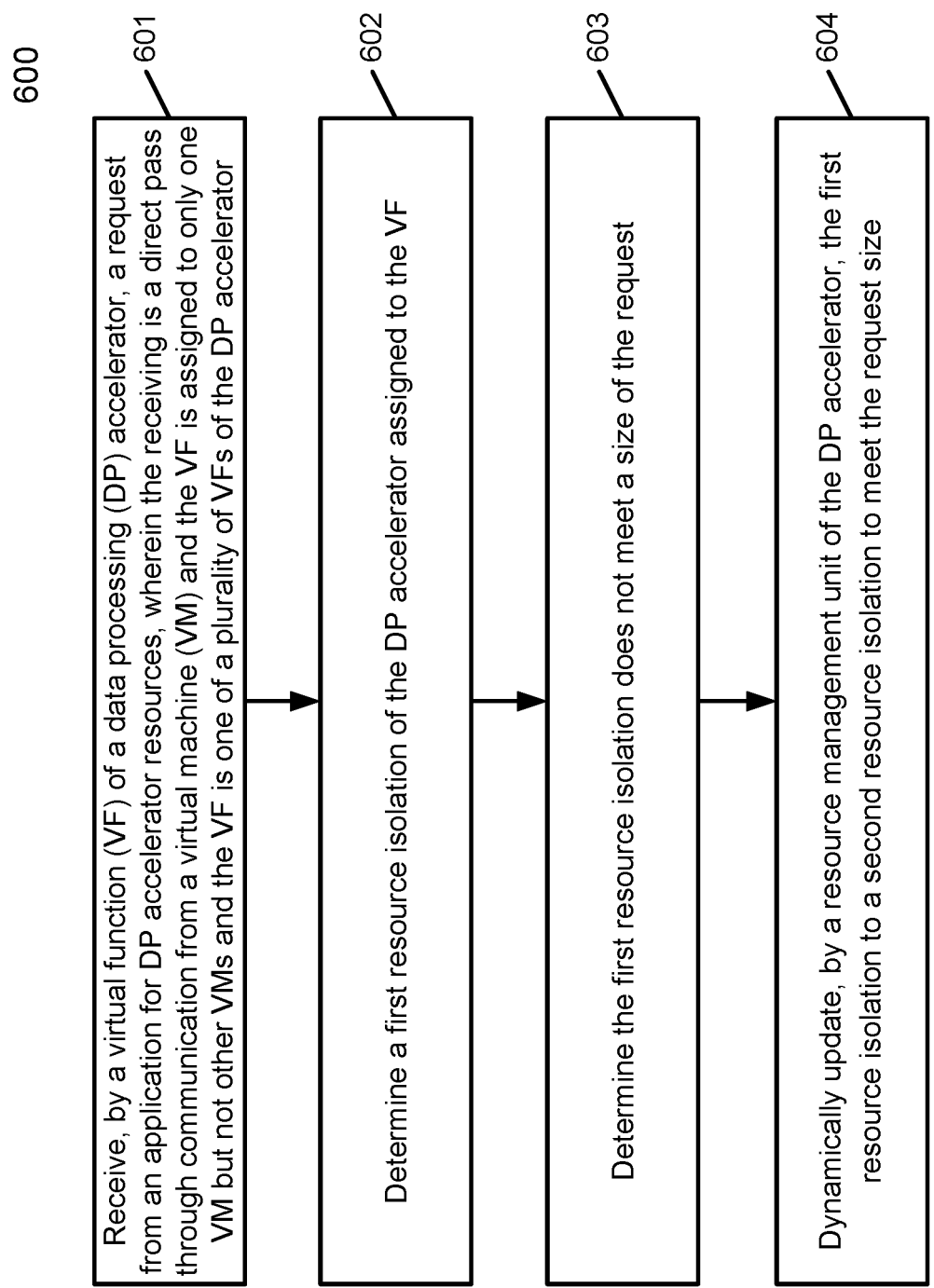
FIG. 6 is a flow chart illustrating an example method for a DP accelerator according to one embodiment.

FIG. 6 is a flow chart illustrating an example method for a DP accelerator according to one embodiment. Process 600 may be performed by processing logic which may include software, hardware, or a combination thereof. For example, process 600 may be performed by host system, such as DP accelerator 107 of FIG. 5. Referring to FIG. 6, at block 601, processing logic (e.g., VF) receives a request from an application for DP accelerator resources, wherein the receiving is a direct pass through communication from a virtual machine (VM), wherein the VF is assigned to only one VM and the VF is one of a plurality of VFs of the DP accelerator. At block 602, processing logic determines a first isolation of the DP accelerator resources are assigned to the VF. At block 603, processing logic determines the first isolation of resources does not meet a size of the request. At block 604, processing logic dynamically updates, by a resource management unit of the DP accelerator, the first resource isolation to a second resource isolation to meet the request size.

In one embodiment, the request includes a request to train an AI model. In one embodiment, the hardware I/O information of the VF is located at a driver of the VM at a host hosting the application.

In one embodiment, the DP accelerator includes a single root input output virtualization (SR-IOV) pass through device. In one embodiment, the VM of the host is initially assigned the VF by a virtual machine manager (VMM) of the host In one embodiment, data packets are transmitted directly between the VM and the VF assigned to the VM without passing through the VMM. In one embodiment, data packets are transmitted between the VM and the VF corresponding to the VM via direct memory access (DMA) independent of a processing unit of the host.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A data processing (DP) accelerator, comprising:
   one or more processors;
   a resource management unit;
   one or more resources of the DP accelerator managed by the resource management unit, wherein the one or more resources of the DP accelerator are dynamically configured and isolated by the resource management unit in response to executing an instruction by the one or more processors;
   plurality of virtual functions (VFs) each associated with one of the one or more resources, wherein a virtual machine (VM) of a host is assigned with one of the plurality of VFs to access the resources associated with the assigned VF, wherein the VM has no access to the rest of the one or more resources, and wherein the resources are dynamically configured based on a request size corresponding to a size of resources at the DP accelerator needed by an application running at the VM; and
   a plurality of queues each associated with one of the plurality of VFs, the plurality of queues including one queue associated with the assigned VF and configured to store data for transmission from the assigned VF to the VM,
   wherein the VM transmits data packets directly to the VF via hardware access to the VF using a VF driver running on the VM.

2. The DP accelerator of claim 1, wherein the DP accelerator includes a single root input output virtualization (SR-IOV) pass through device.

3. The DP accelerator of claim 1, wherein the resource management unit includes a table mapping the plurality of VFs to the one or more resources.

4. The DP accelerator of claim 1, wherein the queue associated with the VF is associated with a memory address of the VM.

5. The DP accelerator of claim 1, wherein data packets are transmitted from the VF to the VM via direct memory access (DMA) independent of a processing unit of the host.

6. The DP accelerator of claim 1, wherein a virtual machine manager (VMM) of the host assigns VM of the host to communicate with the VF.

7. The DP accelerator of claim 1, wherein data packets are transmitted directly between the VM and the VF assigned to the VM without passing through a virtual machine manager (VMM).

8. A data processing (DP) system, comprising:
   a host; and
   a DP accelerator coupled to the host, the DP accelerator comprising:
   a resource management unit,
   one or more resources of the DP accelerator managed by the resource management unit, wherein the one or more resources of the DP accelerator are dynamically configured and isolated by the resource management unit in response to an instruction,
   a plurality of virtual functions (VFs) each associated with one of the one or more resources, wherein a virtual machine (VM) of the host is assigned one of the plurality of VFs to access the resources associated with the assigned VF, wherein the VM has no access to the rest of the one or more resources, and wherein the resources are dynamically configured based on a request size corresponding to a size of resources at the DP accelerator needed by an application running at the VM, and
   a plurality of queues each associated with one of the plurality of VFs, the plurality of queues including one queue associated with the assigned VF and configured to store data for transmission from the assigned VF to the VM, wherein the VM transmits data packets directly to the VF via hardware access to the VF using a VF driver running on the VM.

9. The DP system of claim 8, wherein the DP accelerator includes a single root input output virtualization (SR-IOV) pass through device.

10. The DP system of claim 8, wherein the resource management unit includes a table mapping the plurality of VFs to the one or more resources.

11. The DP system of claim 8, wherein data packets are transmitted from the VF to the VM via direct memory access (DMA) independent of a processing unit of the host.

12. A computer-implemented method, comprising:
receiving, by a virtual function (VF), a request from an application for data processing (DP) accelerator resources, wherein the receiving is a direct pass through communication from a virtual machine (VM), wherein the VF is assigned to only one VM and the VF is one of a plurality of VFs of the DP accelerator;
determining a first isolation of the DP accelerator resources are assigned to the VF;
determining the first isolation of DP accelerator resources does not meet a size of the request corresponding to a size of the DP accelerator resources needed by the application running at the VM;
dynamically partitioning the first isolation of DP accelerator resources to second isolation of DP accelerator resources by a resource management unit of the DP accelerator to meet the request size; and
storing, in response to performance of the request from the application for data processing, data for transmission from the VF to the VM in a queue associated with the VF, wherein the queue is one of a plurality of queues each associated with one of the plurality of VFs, wherein data packets are transmitted directly between the VM and the VF assigned to the VM without passing through a virtual machine manager (VMM).

13. The computer-implemented method of claim 12, wherein the request includes a request to train an artificial intelligence (AI) model.

14. The computer-implemented method of claim 12, wherein hardware input/output (I/O) information of the VF is located at a driver of the VM at a host hosting the application.

15. The computer-implemented method of claim 12, wherein the DP accelerator includes a single root input output virtualization (SR-IOV) pass through device.

16. The computer-implemented method of claim 12, wherein the VM of the host is initially assigned the VF by a virtual machine manager (VMM) of the host.

17. The computer-implemented method of claim 12, wherein data packets are transmitted between the VM and the VF corresponding to the VM via direct memory access (DMA) independent of a processing unit of the host.

* * * * *